United States Patent
Maxted et al.

(10) Patent No.: US 8,250,952 B2
(45) Date of Patent: Aug. 28, 2012

(54) METHOD OF MACHINE TOOL CALIBRATION

(75) Inventors: Paul Maxted, Bristol (GB); Marc Thomas Berkeley Saunders, Birdlip (GB); David Roberts McMurtry, Dursley (GB); Christopher Ray Watson, Dursley (GB)

(73) Assignee: Renishaw PLC, Wotton-Under-Edge (GB)

( * ) Notice: Subject to any disclaimer, the term of this patent is extended or adjusted under 35 U.S.C. 154(b) by 996 days.

(21) Appl. No.: 12/086,015

(22) PCT Filed: Dec. 11, 2006

(86) PCT No.: PCT/GB2006/004643
§ 371 (c)(1),
(2), (4) Date: Jun. 4, 2008

(87) PCT Pub. No.: WO2007/068912
PCT Pub. Date: Jun. 21, 2007

(65) Prior Publication Data
US 2009/0183610 A1    Jul. 23, 2009

(30) Foreign Application Priority Data
Dec. 13, 2005 (GB) .................................. 0525306.7

(51) Int. Cl.
*B23B 3/00* (2006.01)
*B23B 25/00* (2006.01)
(52) U.S. Cl. .......................................... 82/1.11; 82/118
(58) Field of Classification Search .................... 33/504; 82/118, 1.11; 700/275
See application file for complete search history.

(56) References Cited

U.S. PATENT DOCUMENTS

| | | | |
|---|---|---|---|
| 3,656,124 A * | 4/1972 | McGee ............................ 700/275 |
| 3,834,256 A * | 9/1974 | Abbatiello et al. ............. 82/133 |
| 4,513,646 A * | 4/1985 | McMurtry ...................... 82/1.11 |
| 4,888,550 A | 12/1989 | Reid |
| 4,899,094 A | 2/1990 | Pilborough |
| 4,962,591 A | 10/1990 | Zeller et al. |
| 5,187,874 A | 2/1993 | Takahashi et al. |
| 5,309,646 A | 5/1994 | Randolph, Jr. et al. |
| 5,329,457 A | 7/1994 | Hemmerle et al. |
| 5,357,450 A | 10/1994 | Hemmerle et al. |
| 5,373,222 A | 12/1994 | Hemmerle et al. |

(Continued)

FOREIGN PATENT DOCUMENTS
DE     31 32 383 A1    3/1983

(Continued)

OTHER PUBLICATIONS

Sep. 16, 2011 Office Action issued in Chinese Patent Application No. 201010547350.1 (with translation).

(Continued)

*Primary Examiner* — Will Fridie, Jr.
(74) *Attorney, Agent, or Firm* — Oliff & Berridge, PLC

(57) ABSTRACT

Methods are described for calibrating a turning machine having a first rotatable portion or chuck for holding a workpiece. The first rotatable portion has a first feature associated therewith. The method comprises the steps of using a measurement probe to determine the position of the first feature, rotating the first rotatable portion through an angle, and using said measurement probe to determine the new position of the first feature. The extension of the technique to swivel head mill-turn machines is also described.

38 Claims, 12 Drawing Sheets

U.S. PATENT DOCUMENTS

| | | | |
|---|---|---|---|
| 5,713,253 A * | 2/1998 | Date et al. ................ | 82/1.11 |
| 5,813,128 A | 9/1998 | Bailey | |
| 6,023,850 A | 2/2000 | Trapet | |
| 6,112,423 A | 9/2000 | Sheehan | |
| 6,748,790 B2 | 6/2004 | Abbe | |
| 7,055,367 B2 | 6/2006 | Hajdukiewicz et al. | |
| 7,278,222 B2 | 10/2007 | Maier et al. | |
| 2006/0021208 A1 | 2/2006 | Phau et al. | |
| 2006/0201010 A1 | 9/2006 | Maier et al. | |

FOREIGN PATENT DOCUMENTS

| | | |
|---|---|---|
| DE | 198 58 154 A1 | 6/2000 |
| DE | 100 48 096 A1 | 4/2002 |
| DE | 101 57 174 A1 | 6/2003 |
| DE | 102 39 694 A1 | 3/2004 |
| DE | 10 2006 038064 | 8/2006 |
| EP | 0 269 286 A2 | 6/1988 |
| EP | 0 283 486 B1 | 12/1991 |
| EP | 1 505 464 A2 | 2/2005 |
| EP | 1 696 289 A1 | 2/2006 |
| GB | 2 108 715 A | 9/1982 |
| JP | A-58-82649 | 5/1983 |
| JP | A-05-250019 | 9/1993 |
| JP | A-05-257514 | 10/1993 |
| JP | A-2002-215211 | 7/2002 |
| JP | A-2004-272887 | 9/2004 |
| JP | A-2005-059102 | 3/2005 |
| WO | WO 2004/037486 A1 | 5/2004 |
| WO | WO 2007/068912 A1 | 6/2007 |

OTHER PUBLICATIONS

Office Action dated Dec. 13, 2011 issued in Japanese Patent Application No. 2008-545082 (with translation).

"Axes of Rotation: Methods for Specifying and Testing," *The American Society of Mechanical Engineers*, 1985, pp. 1-43.

"CMMs with the axis of a rotary table as the fourth axis," *International Standard*, 2000, 1$^{st}$ Edition, pp. 1-12.

Dassanayake et al., A strategy for identifying static deviations in universal spindle head type multi-axis machining centers, *International Journal of Machine Tools & Manufacture*, 2006, vol. 46, pp. 1097-1106.

Tsutumi et al., "Identification and compensation of systematic deviations particular to 5-axis machining centers," *International Journal of Machine Tools & Manufacture*, 2003, vol. 43, pp. 771-780.

Lei et al., Accuracy test of five-axis CNC machine tool with 3D probe-ball. Part II: errors estimation, *International Journal of Machine Tools & Manufacture*, 2002, vol. 42, pp. 1163-1170.

Yang et al., "Error analysis and compensation for the volumetric errors of a vertical machining centre using a hemispherical helix ball bar test," *Int J Adv Manuf Technol*, 2004, vol. 23, pp. 495-500.

Partial European Search Report in European Patent Application No. 10010429.8; dated Jan. 13, 2011.

* cited by examiner

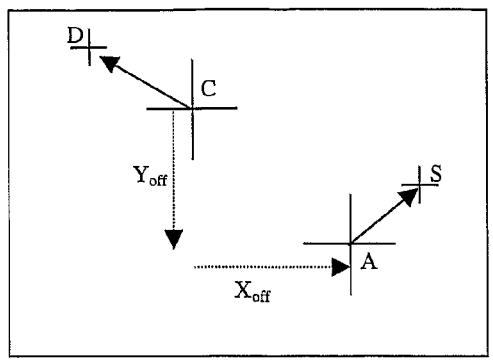
Fig. 4a
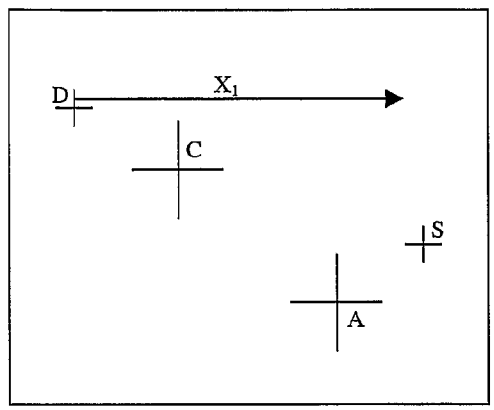
Fig. 4b
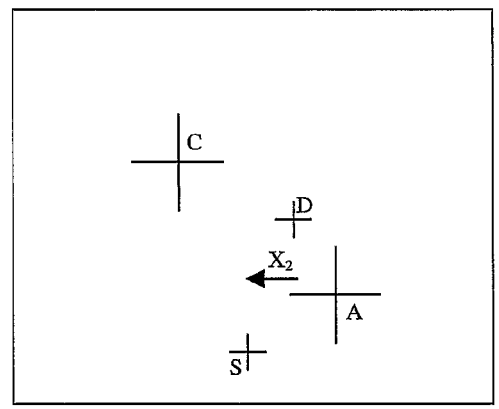
Fig. 4c
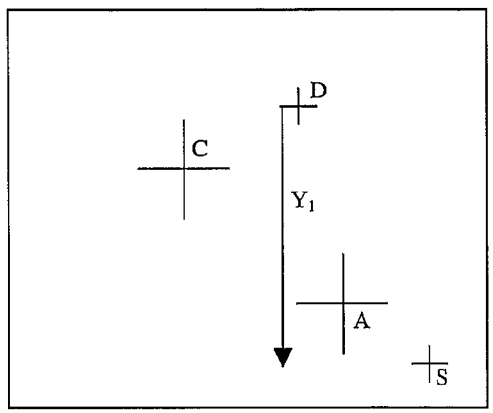
Fig. 4d
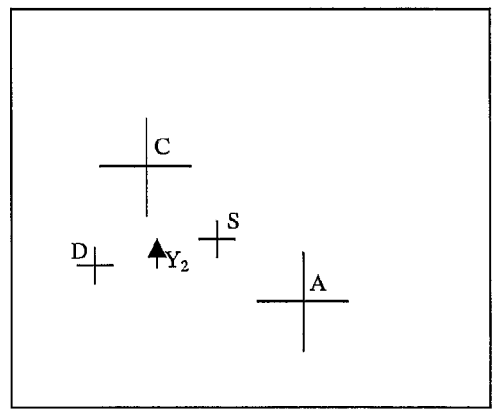
Fig. 4e
FIGURE 4

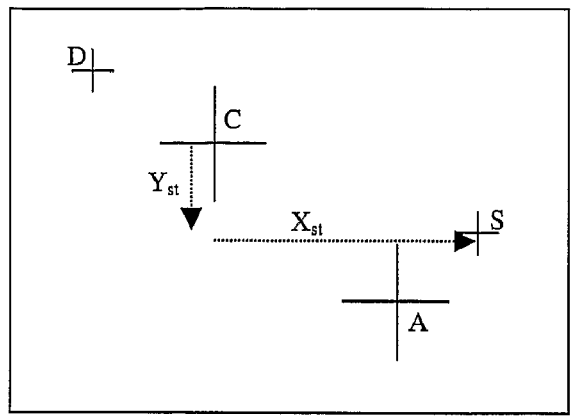
Fig 5a
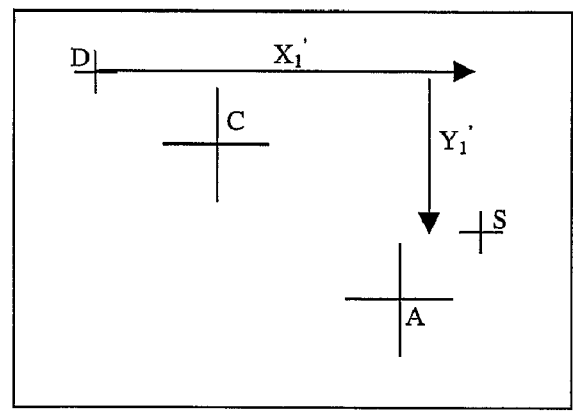
Fig. 5b
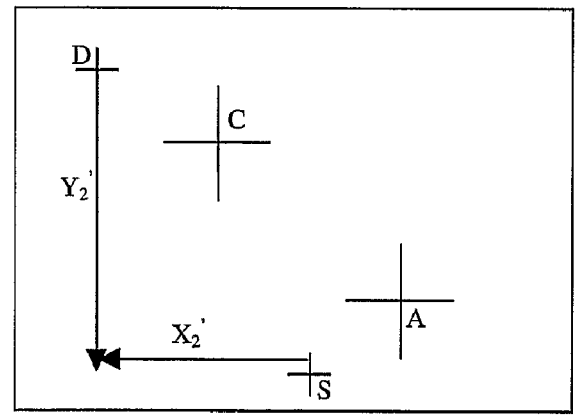
Fig 5c
FIGURE 5

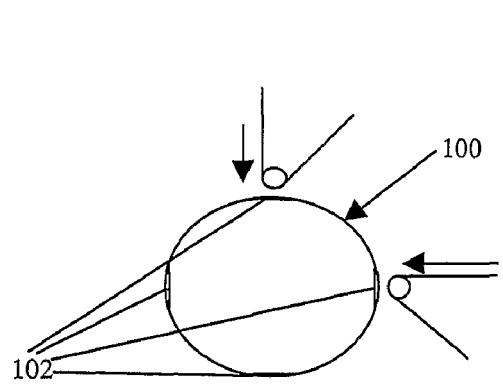
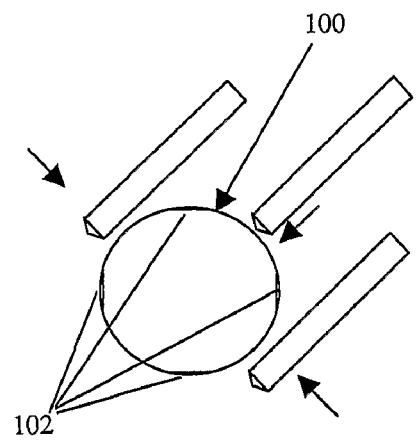
Fig. 10a                Fig 10b
FIGURE 10
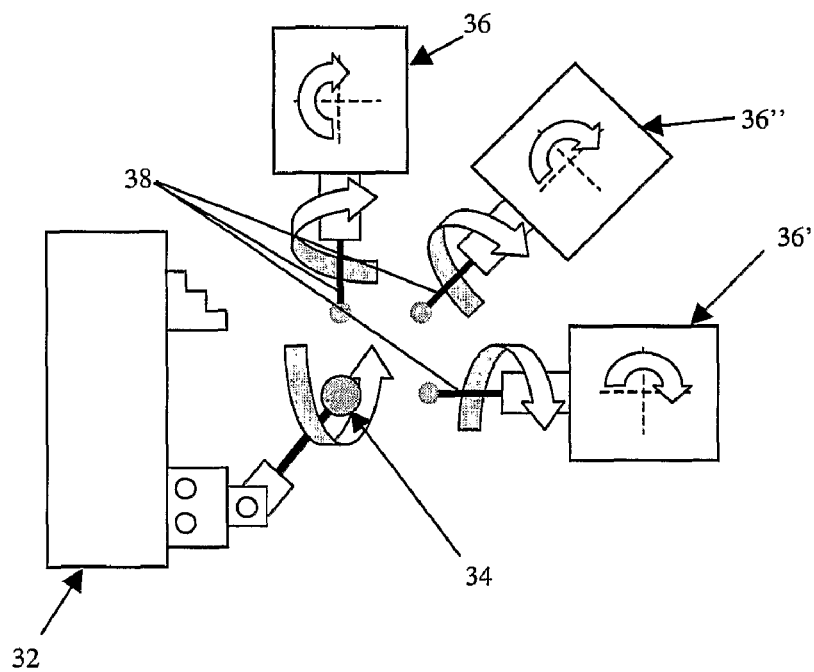
FIGURE 11

METHOD OF MACHINE TOOL CALIBRATION

The present invention relates to machine tools, and in particular to a method of calibrating turning machines such as lathes, mill-turn machines and the like.

Lathes are well known. In a typical lathe, a workpiece is held in a chuck and rotated at high speed. A cutting tool is then brought into contact with the rotating workpiece to cut or "turn" the workpiece to the desired shape.

Mill-turn machines, which could be considered to be a variant of a lathe, are also known. Such machine comprise a rotatable chuck to hold the workpiece and also have means for rotating the cutting tools. The workpiece may then be turned in the same manner as a standard lathe and/or a rotating tool may be used to mill features in the workpiece. Mill-turn machines may also have a swivel head to allow cutting tools to be brought into contact with the workpiece from a number of different directions.

When operating lathes, mill-turn machines and the like it is typically necessary to determine the axis of rotation (the so-called centre line) of the workpiece. This is because the size of any features cut into the workpiece are determined by the position of the cutting tool relative to the lathe centre line.

A number of manual methods for finding a lathe centre line are known. For example, a dial test indicator could be used. However, there is increasingly a desire to automate machine tool calibration and cutting operations to minimise machine downtime and to increase the reproducibility of machined parts.

EP0283486 describes various methods for determining the axis of rotation of a chuck using a touch trigger measurement probe loaded into the tool holder of a lathe. In particular, EP0283486 describes how such a touch trigger probe can then be used to estimate the axis of rotation of a workpiece held in the chuck of a lathe by measuring the position of diametrically opposed points of the workpiece. In one embodiment of EP0283486, it is described how a sacrificial cut of the workpiece can be made and diametrically opposed points of the cut feature measured to establish the centre line. However, making a sacrificial cut in a workpiece is not always possible and such a cutting process can be unacceptably time consuming.

It is thus an object of the present invention to provide an improved method for calibrating turning machines such as lathes, mill-turn machines and the like.

According to a first aspect of the present invention, a method is provided for calibrating a turning machine having a first rotatable portion for holding a workpiece, the first rotatable portion having a first feature associated therewith, wherein the method comprises the steps of;

(i) using a measurement probe to determine the position of the first feature,
(ii) rotating the first rotatable portion through an angle, and
(iii) using said measurement probe to determine the new position of the first feature.

Advantageously, the method further comprises the step of (iv) calculating the position of the axis of rotation of the first rotatable portion (the "C-axis") using the position measurements determined in steps (i) and (iii). For example, the position of the C-axis may be found relative to the X and Y axes of the turning machine.

The present invention thus uses a first feature that is part of, or attached to, the first rotatable portion of a turning machine and has a fixed (typically unknown) position relative to that first rotatable portion. The first feature may be any feature that can have its position measured by a probe; for example, it may comprise a post, pillar, datum sphere etc. The measurement probe used to measure the position of the feature may be a contact probe (e.g. a touch trigger probe) or a non-contact probe. Using the measurement probe to determine the position of the first feature relative to the body of the machine when the rotatable portion is in two (or more) different rotational orientations allows the axis of rotation of the first rotatable portion (the so-called C-axis or lathe centre line) of the turning machine to be accurately determined.

The method of the present invention thus enables the true centre line (C-axis) of the turning machine to be found without having to make a cut in a workpiece. Furthermore, it has been found that the method of the present invention is not subject to the errors that can occur when two different features of a chuck or workpiece are measured. In particular, the method of the present invention can be used to find the true centre line of the machine without relying on the assumption that a pair of features are equidistant from the centre line. The invention can thus be seen to be an improvement over techniques of the type described in EP0283486.

The method also has the advantage that it can be performed in a completely automated manner and is thus substantially quicker to perform than manual set-up techniques (e.g. using dial test indicators). The method can also be performed relatively quickly (e.g. between parts) allowing regular calibration of the machine to occur thereby reducing machining errors associated with changes in the position of the centre line during use.

It should be noted that, herein, the term "turning machine" defines a machine having a first rotatable portion (e.g. a chuck) that can hold a workpiece and is arranged so that a cutting tool can be brought into contact with the workpiece as it rotates; i.e. it is a machine in which a workpiece can be "turned". A turning machine may thus comprise a traditional lathe or a mill-turn machine. The turning machine may also comprise a milling machine or machining centre in which the workpiece can be rotated during cutting. The turning machine may have its C-axis in any orientation; for example the machine may have a substantially horizontal or a substantially vertical C-axis orientation. The turning machine may also comprise a first rotatable portion that can be re-orientated relative to the machine as required; for example, it may be a machining centre in which the orientation of the C-axis can be adjusted relative to a fixed tool (e.g. it may comprise a 5-axis machining centre in which the chuck holding the workpiece can be swiveled). However, it should be noted that turning machines are quite distinct to basic milling machines in which a workpiece is always held stationary when it is being cut.

Conveniently, step (ii) comprises rotating the first rotatable portion through an angle of 180°. It should be noted that, herein, the geometry is defined such that the first rotatable portion rotates in the X-Y plane of the machine and the C-axis of rotation is nominally aligned with z-axis of the machine; although it should be noted that the C-axis may not always be perfectly aligned with the z-axis as described below. Using such a co-ordinate geometry, the measurements of steps (i) and (iii) each give a pair of X,Y co-ordinates. The centre line position (in X and Y) is thus the midpoint of the two measured X and Y positions. The skilled person would appreciate that position measurements could be taken using a different co-ordinate geometry if desired. Furthermore, step (ii) could comprise rotating the first rotatable portion through any angle. For example, the first rotatable portion could be rotated through an angle less than 180°, less than 90° or more than 90° or more than 180° as required.

For certain kinds of turning machine, such as large lathes, the measurement probe may only have a limited reach. This may limit the maximum angular step change that can be used during step (ii) of the method. Step (ii) may thus comprise rotating the first rotatable portion through an angle of less than 180° or through an angle of no more than 90°. Advantageously, the method may then comprise an initial step of determining the position of the axis of rotation of the first rotatable portion in a first machine axis. This initial step may comprise taking measurements either side of an assumed centre line of the first machine axis as described in more detail below. The first machine axis may, for example, be the X-axis and the initial step would then comprise determining the X-axis centre line. Advantageously, step (i) then comprises orientating the first rotatable portion so that the first feature is located substantially on said first machine axis. In this manner, the position of the machine centre line (e.g. in both X and Y) can be established.

Advantageously, the turning machine comprises a tool holder, wherein the measurement probe used in steps (i) and (iii) to determine the position of said first feature is held by said tool holder. The tool holder may hold one or more cutting tools or tool accessories (such as the measurement probe). The tool holder is preferably moveable (e.g. in x, y and z) relative to the first rotatable portion of the turning machine and also provides the positional information of steps (i) and (iii) of the method. The tool holder thus allows tools or accessories to be brought into contact with the workpiece and also outputs tool position information to the machine controller. Typically, the tool holder is arranged such that cutting tools and tool accessories can be automatically interchanged.

Conveniently, the tool holder comprises a second rotatable portion for holding a tool or tool accessory. The turning machine may thus comprise a so-called mill-turn machine that allows the milling of workpieces in addition to the turning of such workpieces. A mill-turn machine typically has a head that comprises the rotatable portion and an automatic tool changer that allows tools (e.g. cutting tools and milling tools) and tool accessories (e.g. measurement probes) to be loaded into the second rotatable portion as required. Advantageously, the measurement probe used in steps (i) and (iii) to determine the position of said first feature is held by said second rotatable portion. The method may conveniently comprise the step of rotating the second rotatable portion (and hence the measurement probe) through an angle.

The second rotatable portion is advantageously carried by a swivel head, the swivel head being rotatable about at least one axis (the "B-axis"). The swivel head may also carry one or more additional rotatable portions for carrying additional tools or tool accessories. The method can thus be implemented using what is typically called a swivel head mill-turn machine. Such a machine has a swivel head that can be rotated to introduce a tilt between the axis of rotation of the first rotatable portion and the axis of rotation of the second rotatable portion; i.e. rotation about the B-axis alters the angle between the A and C axes. The A-axis is typically said to be nominally aligned with the C-axis when the B-axis is at 0° rotation. As described above, such a swivel head is moveable in x, y and z and is also rotatable to allow a tool or tool accessory to be brought into contact with a workpiece at different orientations; this increases the range of features that can be turned or milled in the workpiece.

The method may conveniently be applied to a turning machine in which the first rotatable portion can be swiveled or tilted about an axis. For example, the first rotatable portion may be carried by a cradle that can be moved to alter the tilt of the first rotatable portion relative to a second rotatable portion having a fixed position. In common with a swivel head machine, such a machine also introduces a tilt between the axis of rotation of the first rotatable portion and the axis of rotation of the second rotatable portion. The method may also be applied to turning machines having both a swivel head and a first rotatable portion that can be swiveled or tilted about one or more axes.

Advantageously, steps (i) to (iii) are performed with the axis of rotation of the second rotatable portion of the swivel head arranged to be substantially parallel with the axis of rotation of the first rotatable portion (i.e. with B=0°). In this manner the position of the C-axis of the first rotatable portion (e.g. a chuck) can be determined relative to the A-axis of the second rotatable portion when the swivel head is in the B=0° orientation.

Preferably, the method comprises rotating the second rotatable portion through an angle. This may advantageously be used to obtain a measure of any stylus offset or the like. Advantageously, step (ii) may comprise the step of rotating the second rotatable portion through an angle. In this manner, the first rotatable portion and the second rotatable portion can both be rotated between measurements; the amount that the first and second rotatable portions are rotated is preferably the same but it may be different if required. The first and second rotatable portions may be rotated together, or in turn, as required.

Advantageously, steps (ii) and (iii) are repeated one or more times. In this manner, a number of measurements of the position of the first feature are made with the first rotatable portion and, if required, the second rotatable portion rotated to a number of different orientations.

Conveniently, step (i) is performed with the first and second rotatable portions orientated at 0°, step (ii) comprises rotating the first and second rotatable portions through 90°, and steps (ii) and (iii) are performed four times. The method may thus be initiated with both the A and C axes at 0°. The method then results in four measurements of the (x,y) position of the first feature being made with the following axial rotations: (A=0°, C=0°), (A=90°, C=90°), (A=180°, C=180°) and (A=270°, C=270°).

It should be noted that although the first and second rotatable portions can be rotated together in the manner described above, the skilled person would appreciate that a number of variations to such a method could be used. For example, step (i) could comprise the step of determining the position of the feature with the second rotatable portion in each of two or more rotational orientations and/or step (iii) could comprise the step of determining the position of the feature with the second rotatable portion in each of two or more rotational orientations.

Advantageously, step (i) comprises setting the orientation of the first rotatable portion to 0° and measuring the position of the first feature with the second rotatable portion at both 0° and 180°, step (ii) comprises rotating the first rotatable portion through 180° and step (iii) comprises measuring the position of the first feature with the second rotatable portion at both 0° and 180°. The method then provides four measurements of the (x,y) position of the first feature with the following axial rotations: (A=0°, C=0°), (A=180°, C=0°), (A=0°, C=180°) and (A=180°, C=180°).

The method advantageously comprises the additional step of determining the relative displacement of the axes of rotation of the first rotatable portion and the second rotatable portion. As described in more detail below, such relative displacement of the C and A axes can be readily determined from either of the four sets of x and y position measurements described above. The skilled person would recognise that many other different sets of measurements could also yield similar information about axis alignment.

According to a second aspect of the invention, a method is provided of determining the (e.g. x,y) position of the axis of rotation of the first rotatable portion as a function of displacement along a translational (e.g. z) axis of the turning machine, the method comprising the steps of:

(A) determining the (x,y) position of the axis of rotation of the first rotatable portion using the method of the first aspect of the invention, (B) translating (in Z) the measurement probe and/or first rotatable portion along said translational axis, and (C) determining the (x,y) position of the axis of rotation of the first rotatable portion using the method of the first aspect of the invention.

Steps (B) and (c) may be repeated one or more times as required. In this manner, the c-axis position is determined relative to the z-axis at two or more locations. The method may further comprise the step of (D) determining the angular alignment of the axis of rotation of the first rotatable portion (the so-called "C-axis") relative to an axis of the turning machine (e.g. the "z-axis") using the measurements of steps (A) and (C).

A further, analogous, method may also be used to determine the (e.g. x,y) position of the axis of rotation of the second rotatable portion as a function of displacement along a translational (e.g. z) axis of a turning machine, the method comprising the steps of:

(A) determining the (x,y) position of the axis of rotation of the second rotatable portion using a method of the first aspect of the invention, (B) translating (in Z) the measurement probe, and (C) determining the (x,y) position of the axis of rotation of the second rotatable portion using the method of the first aspect of the invention.

Steps (B) and (c) may be repeated one or more times as required. In this manner, the A-axis position can be determined relative to the z-axis at two or more locations. The method may further comprise the step of (D) determining the angular alignment of the axis of rotation of the second rotatable portion (the so-called "A-axis") relative to a translational (e.g. lateral) axis of the turning machine (e.g. the "z-axis") using the measurements of steps (A) and (C).

For turning machines having a second rotatable portion, the alignment of the A and/or C axes with respect to the z-axis can thus be determined. This allows the alignment of axes to be corrected or for the machine to automatically correct tool position to prevent unwanted taper during cutting.

According to a third aspect of the invention, a method is provided for aligning a swivel axis turning machine having a first rotatable portion for holding a workpiece and a second rotatable portion for holding a tool or tool accessory, wherein the axis of rotation of the first rotatable portion can be tilted (e.g. swiveled) relative to the axis of rotation of the second rotatable portion and the first rotatable portion has a second feature associated therewith, the method comprising the steps of:

(a) taking a swivel axis turning machine in which the relative displacement of the axes of rotation of the first rotatable portion and the second rotatable portion have been determined using the method according to the first aspect of the invention, (b) using a measurement probe held by the second rotatable portion to determine the position of the second feature, and (c) altering the tilt between the axis of rotation of the first rotatable portion and the axis of rotation of the second rotatable portion and repeating step (b).

Advantageously, the swivel axis turning machine comprises a swivel head turning machine in which the second rotatable portion is carried by the swivel head, wherein step (c) comprises rotating the swivel head to a different ("B-axis") orientation and repeating step (b). Alternatively or additionally, the first rotatable portion may be adapted to be swiveled relative to the second rotatable portion. Any swivel may be about one, or more than one, axes as required.

For a typical swivel head turning machine, the measurements required to determine the position of the second feature are taken at a first swivel head orientation (e.g. B=0°). The head is then swiveled to a second (e.g. B=90°) orientation where the measurement probe is again used to take the measurements necessary to determine the position of the second feature. Further measurements with the swivel head at different B-axis orientations (e.g. 45°) may also be taken.

It should be noted that step (b) preferably comprises measuring the position of the second feature in x, y and z and may thus require a number of different measurements to be taken using the measurement probe. A method for determining the exact centre of a datum sphere using such measurements is described in more detail below. Also, step (a) may comprise using the method of the first aspect of the invention to determine the relative displacement of the axes of rotation of the first rotatable portion and the second rotatable portion.

The method thus involves determining the position of the second feature with the swivel head or the first rotatable portion swiveled to a number of different orientations. In a perfectly aligned machine, the measured position of the second feature would be identical for each of these orientations, however translational errors can cause a deviation between such measurements resulting in errors in tool position or so-called tool offset errors.

Conveniently, the method comprises the step of determining the position of the pivot point (i.e. the swivel axis position) between the axis of rotation of the first rotatable portion and the axis of rotation of the second rotatable portion.

Advantageously, the method also comprises the step of determining the tool offset error as a function of the relative tilt (swivel) between the axes of rotation of the first rotatable portion and the second rotatable portion. In the case of a swivel head turning machine, tool offset error may be measured as a function of swivel head (B-axis) orientation. In other words, two measurements of the position of the second feature can be used to determine the tool offset error for any swivel head (B-axis) orientation. If the tool offset error varies sinusoidally with B-axis orientation as described in more detail below, the two measurements (e.g. at B=0° and B=90°) can be extrapolated to define the tool offset error for any B-axis orientation.

Conveniently, step (b) is repeated with a different displacement between the second feature and the second rotatable portion. Preferably, step (b) is repeated using two or more stylus tips, each stylus tip having a different displacement from the second rotatable portion. Step (b) may advantageously be performed using a multi-tip probe or using two different probes having styli of different length. Conveniently, step (b) is performed at least once using the shank of the stylus of the measurement probe to determine the position of the second feature. In this manner, the tool offset error can be measured for tools of two or more lengths.

The method may conveniently comprise the step of determining tool offset error as a function of the relative tilt between the axes of rotation of the first rotatable portion and the second rotatable portion (e.g. the B-axis orientation of a swivel head machine) and tool length. In this manner, the tool offset error can be calculated for a tool of any length with any relative tilt between the axes of rotation of the first and second rotatable portions. The present invention thus provides an automated method for determining tool offset errors in mill-turn machines or machining centres and allows such turning machines to accurately, and repeatably, turn or mill features into a workpiece.

Advantageously, a common feature provides both the first feature used in the method of the first aspect of the invention and the second feature used in the method of the third aspect of the invention. In other words, a single feature may be used to determine both the centre line (C-axis) position and any translational (tool offset) errors associated with the swivel head. Alternatively, the first feature may be different to the second feature. The second feature preferably comprises a datum sphere; for example, the first rotatable portion may hold a part comprising a datum sphere. The second feature and/or the first feature may advantageously be provided by a shaft or shank comprising two or more datum spheres.

Advantageously, the first rotatable portion of the turning machine comprises said first feature. In other words, the first rotatable portion of the turning machine may have a suitable feature formed therein or attached thereto. The first feature may be permanently or temporarily attached to the first rotatable portion. The first feature may comprise any one or more of a hole, bore, boss, pad, pocket, or block. For example, a chuck could be formed having a post or hole formed at a position around its periphery. Alternatively, the first rotatable portion may hold a part comprising said first feature. For example, the first rotatable portion could hold a part having a first feature formed therein or attached thereto. The part may conveniently comprise a protrusion (e.g. a post or pillar) forming said first feature.

Advantageously, the aforementioned methods also comprise the step of using the measurement probe to determine the position of a tool setting device relative to the position of the axis of rotation of the first rotatable portion. Providing a calibrated link between the tool setting device (e.g. a tool setting cube held by a tool setting arm) and the centre line allows cutting tools to be accurately positioned relative to the centre line.

According to a fourth aspect of the invention, automated turning machine apparatus is provided that is suitably programmed to implement a method according to any one of the first, second and third aspects of the invention.

According to a further aspect of the invention, a computer program for controlling a turning machine is provided, the computer program being such that, when loaded into the computer controller of a suitable turning machine, the machine is adapted to implement the method according to any one of the first, second and third aspects of the invention. A machine readable medium (e.g. a compact disk or floppy disc) containing such a computer program may also be advantageously provided.

According to a further aspect of the invention, a turning machine is provided that has a first rotatable portion for holding a workpiece, the first rotatable portion having a first feature associated therewith, wherein the turning machine comprises a machine controller that is arranged to determine the position of the first feature, rotate the first rotatable portion through an angle and determine the new position of the first feature. Advantageously, the controller comprises a measurement probe to determine the position of the first feature. Advantageously, the controller is further arranged to determine the position of the axis of rotation of the first rotatable portion (the so-called "C-axis") using the determined position measurements. Such a machine may also be conveniently arranged to implement the above described method.

Although positional information is described herein using Cartesian co-ordinates (i.e. with reference to mutually orthogonal x, y and z axes) it should be noted that positional information could also be expressed using different co-ordinate systems (e.g. using polar co-ordinates). Similarly, the terms "A-axis", "B-axis" and "C-axis" are simply used herein for convenience; different terminology may have been used previously by those skilled in the art to describe such axes of rotation. The use of such terminology should in no way be seen as a limitation to the scope of the present invention.

The invention will now be described, by way of example only, with reference to the accompanying drawings in which;

FIG. 1 shows a lathe chuck in a first and second orientation,

FIG. 2 illustrates the geometrical relationship of the two measurement points and the lathe centre line, FIG. 3 illustrates a mill-turn machine having a swivel head, FIG. 4 illustrates the geometry used to establish the relative position of the A and C axes, FIG. 5 shows the geometry used to establish the position of the stylus relative to the C axis, FIG. 6 shows a mill-turn machine having a head in a swiveled orientation, FIG. 7 shows a dual tip stylus, FIG. 8 shows a mill-turn machine having a swivel head and a tool setting arm, FIG. 9 shows the alignment of a tool cube held by a setting arm, FIG. 10 shows a calibration tool setting disc, FIG. 11 illustrates a mill-turn machine with the milling head located in three different positions, FIG. 12 illustrates misalignment of the main spindle (C-axis) to the z-axis, FIG. 13 shows a dual calibration ball device, FIG. 14 illustrates a dual tip probe for measuring misalignment of the mill spindle (A-axis) to the z-axis, FIG. 15 illustrates a further calibration method for a large lathe in which access to the chuck is restricted;

Figure 1:
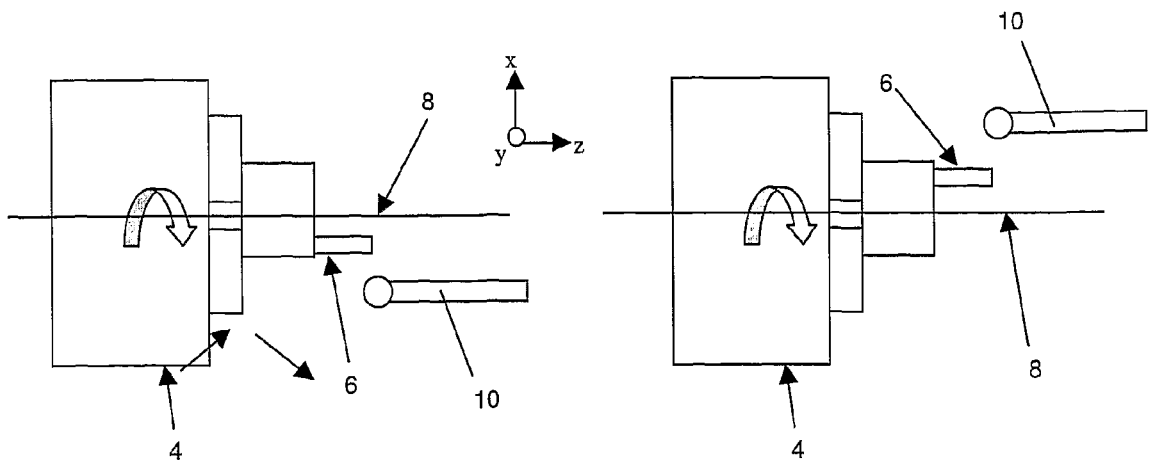

Referring to FIG. 1, a plan view of a lathe chuck 4 having a feature 6 is shown. The feature 6 may be an integral feature formed in or on the chuck or it may be formed in a part that is held by the chuck. An associated measurement probe 10, for example a touch trigger probe of the type described in EP0283486 is also shown. Such a probe would typically be mounted on the tool holder of the lathe (not shown) and could be exchangeable with one or more cutting tools.

The chuck 4 is rotatable about an axis of rotation 8; this axis of rotation is often termed the lathe centre line or C-axis.

FIG. 1a illustrates the chuck 4 in a first orientation and FIG. 1b shows a second orientation in which the chuck 4 has been rotated through 180° relative to the first orientation.

As described above, accurate determination of the lathe centreline (i.e. the axis of rotation of the chuck) is necessary to ensure that parts can be accurately machined with the required diameter. To accurately determine the axis of rotation of the chuck, and hence the rotational axis of any workpiece subsequently held by the chuck, the following measurement routine can be used:

(a) The measurement probe 10 is firstly used to measure the x-y position $(x_1, y_1)$ of feature 6 with the chuck in the orientation shown in FIG. 1a.

(b) The chuck 4 is then rotated through 180° (see FIG. 1b).

(c) The measurement probe 10 is then used to measure the new x-y position $(x_2, y_2)$ of the feature.

Figure 2:
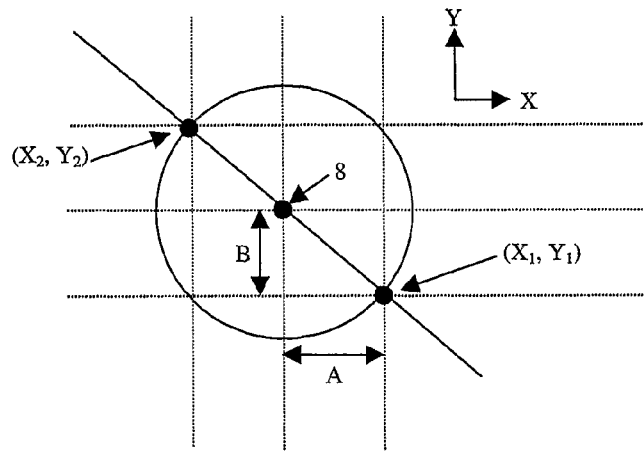

As shown in FIG. 2, a geometrical representation of the measured positions $(x_1, y_1)$ and $(x_2, y_2)$ described with reference to FIG. 1 are illustrated. Distance A is half the difference between $X_1$ and $X_2$ and distance B is half the difference between $Y_1$ and $Y_2$. It can thus be seen that the centre line 8 of the lathe can be readily determined from such measurement.

Once the centre line of the lathe has been determined, the position of a tool setting arm can be measured relative to the lathe centre line using the measurement probe. This, in turn, allows tools to be positioned accurately relative to the centre line of the lathe.

A variant of the above calibration technique will now be described for a mill-turn machine 30.

Figure 3:
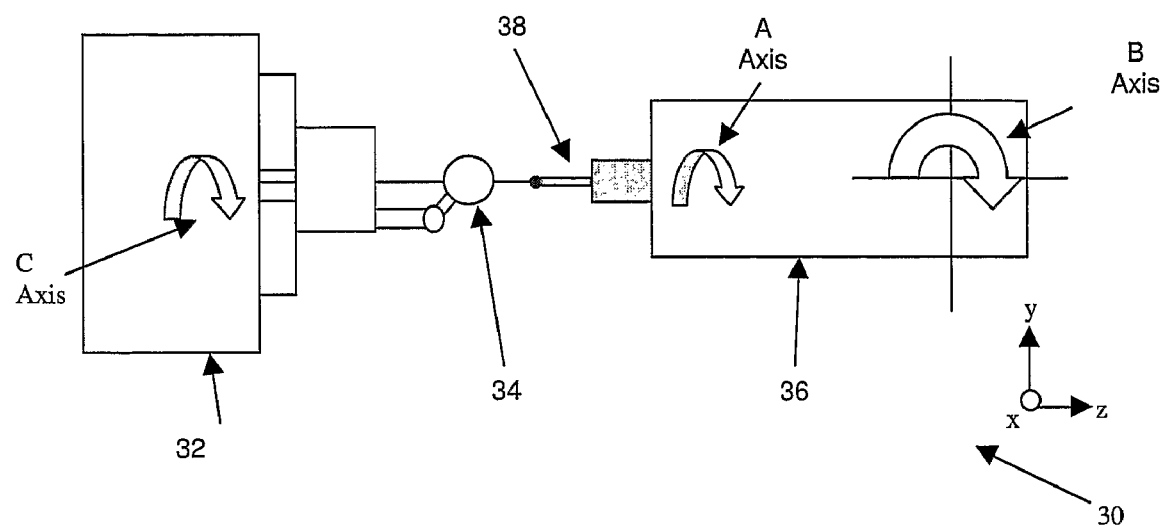

FIG. 3 shows a side view of a mill-turn machine 30. The mill-turn machine comprises a chuck 32 (rotatable about the C-axis) holding a datum sphere 34 and a milling head 36 holding a touch trigger probe 38. The milling head 36 is arranged to hold a tool or a tool accessory (such as the probe 38) and can rotate the tool about the A-axis. The milling head 36 can also swivel in the y-z plane about the B-axis.

In a mill-turn machine, the axis of rotation of the chuck 32 (i.e. the C-axis centre line) must be established relative to the axis of rotation of the part of the milling head 36 (i.e. the A-axis centre line) which holds the tool.

The following method, which is performed with the B-axis set so that the milling head is horizontal (i.e. B=0°), allows the relative x-y positions of the A and C axes to be established:

(i) The C-axis is rotated to 0° and the A-axis is also rotated to 0°. The position of the centre of the datum sphere is then measured using the probe 38.

(ii) The C-axis is rotated to 90° and the A-axis is also rotated to 90°. The position of the centre of the datum sphere is then measured using the probe 38.

(iii) The C-axis is rotated to 180° and the A-axis is also rotated to 180°. The position of the centre of the datum sphere is then measured using the probe 38.

(iv) The C-axis is rotated to 270° and the A-axis is also rotated to 270°. The position of the centre of the datum sphere is then measured using the probe 38.

The midpoint of the measurements of steps (i) and (iii) gives the relative displacement of the A and C axes in the X-direction. The midpoint of the measurements of steps (ii) and (iv) gives the relative displacement of the A and C axes in the Y-direction.

Referring to FIG. 4, the above mentioned calculation used to determine the relative displacement of the A and C axes in the X and Y directions will be explained in more detail.

FIG. 4a illustrates the X and Y offsets ($X_{off}$ and $Y_{off}$) between the A and C axes when both axes are at 0° rotation and the milling head A-axis is nominally aligned to the C-axis. The position of the C-axis centre line is represented by point C and the A-axis centre line position is represented by point A. The centre of the datum sphere held by the chuck is offset a certain (fixed) distance from the C-axis centre line and the position of the datum sphere is thus denoted by point D. Similarly, the stylus ball of the probe is offset a certain (fixed) distance from the A-axis centre line and the position of the stylus tip is denoted by point S.

Referring now to FIG. 4b, the relative positions of the A and C axes when both axes are at 0° rotation is again shown. In addition, the value $X_1$ is shown which represents the measured difference between the nominally aligned stylus ball position S and the position of the datum sphere centre D. In other words, the value $X_1$ is determined by measurement step (i) described above with reference to FIG. 3.

Referring now to FIG. 4c, the relative positions of the A and C axes when both axes are at 180° rotation is shown. The new (i.e. rotated) positions of the datum sphere centre D and stylus ball centre position S are also shown. It can be seen from FIG. 4c that measurement of the datum sphere centre position using the stylus gives the value $X_2$. In other words, the value $X_2$ is determined by measurement step (iii) described above with reference to FIG. 3.

Following the measurement of $X_1$ and $X_2$, the x-axis offset ($X_{off}$) is given by:

$$X_{off} = \frac{X_1 + X_2}{2} \tag{1a}$$

A similar process allows the value of $Y_{off}$ to be determined. Referring to FIG. 4d, the relative positions of the A and C axes when both axes are at 90° rotation is shown. Measurement of the datum sphere centre position using the stylus gives the value $Y_1$. As shown in FIG. 4e, a similar measurement with the A and C axes at 270° yields the value $Y_2$. The values $Y_1$ and $Y_2$ are determined by measurement steps (ii) and (iv) as described above with reference to FIG. 3. Following the measurement of $Y_1$ and $Y_2$, the y-axis offset ($Y_{off}$) is given by:

$$Y_{off} = \frac{Y_1 + Y_2}{2} \tag{1b}$$

Once the values of $Y_{off}$ and $X_{off}$ have been measured in the manner described above, the relative position of the A and C axes is known; i.e. the machine has calibrated alignment of the A and C axes.

In addition to determining the relative displacement of the A and C axes, the stylus offset (i.e. the displacement of the probe tip or stylus to the C-axis centre line) can also be determined. The stylus offset may be measured before, or after, the relative displacement of the A and C centres lines has been determined using the method outlined above. Knowing both the relative displacement of the A and C axes and the stylus offset enables the probe to take position measurements relative to the (known) c-axis centre line.

The stylus offset ($X_{st}$, $Y_{st}$) can thus be determined by the steps of;

(v) Keeping the C-axis stationary and, with the A axis rotated to 0°, measuring the X-Y position of the datum sphere, and (vi) rotating the A-axis to 180° and re-measuring the X-Y position of the datum sphere.

The stylus offset ($X_{st}$, $Y_{st}$) can then be determined from half the deviation in the measurements taken in steps (v) and (vi).

Although the above described methods provide a convenient way of finding the relative position of the A and C axes and/or the stylus offset, the skilled person would recognise the numerous alternative sets of measurements that could be used to establish the (x,y) position of the C axis. For example, the following method could be used:

(i) The C-axis is rotated to 0° and the A-axis is also rotated to 0°. The (x,y) position of the centre of the datum sphere is then measured using the probe 38.

(ii) The C-axis is kept at 0° and the A-axis is rotated to 180°. The (x,y) position of the centre of the datum sphere is then measured using the probe 38.

(iii) The C-axis is rotated to 180° and the A-axis is rotated to 0°. The (x,y) position of the centre of the datum sphere is then measured using the probe 38.

(iv) The C-axis is kept at 180° and the A-axis is rotated to 180°. The (x,y) position of the centre of the datum sphere is then measured using the probe 38.

The midpoint of the measurements taken in steps (i) and (ii) are used to provide a C=0° centre of rotation position whilst the midpoint of the measurements taken in steps (iii) and (iv) are used to provide a C=180° centre of rotation position. The midpoint of the C=0° and C=180° centre of rotation positions then provides the C-axis centre of rotation position.

Referring to FIG. 5, the geometry of the stylus offset measurement described with reference to FIG. 4 is illustrated in more detail.

FIG. 5a shows the position of the A and C axes at 0° rotation and also illustrates the positions of the datum sphere D and the stylus ball S. The stylus offset $(X_{st}, Y_{st})$ that is to be measured is also shown.

FIG. 5b shows the position of the A and C axes at 0° rotation and also illustrates the relative displacement $(X_1', Y_1')$ between the datum sphere D and the stylus ball S as measured during step (v) of the above described method.

FIG. 5c shows the relative positions when the A axis is at 0° and the C axis is rotated to 180°. The relative displacement $(X_2', Y_2')$ between the datum sphere D and the stylus ball S as measured during step (vi) of the above described method is also shown.

The stylus offset can thus be determined from:

$$X_{st} = \frac{X_1' + X_2'}{2} \tag{2a}$$

$$Y_{st} = \frac{Y_1' + Y_2'}{2} \tag{2b}$$

Figure 6:
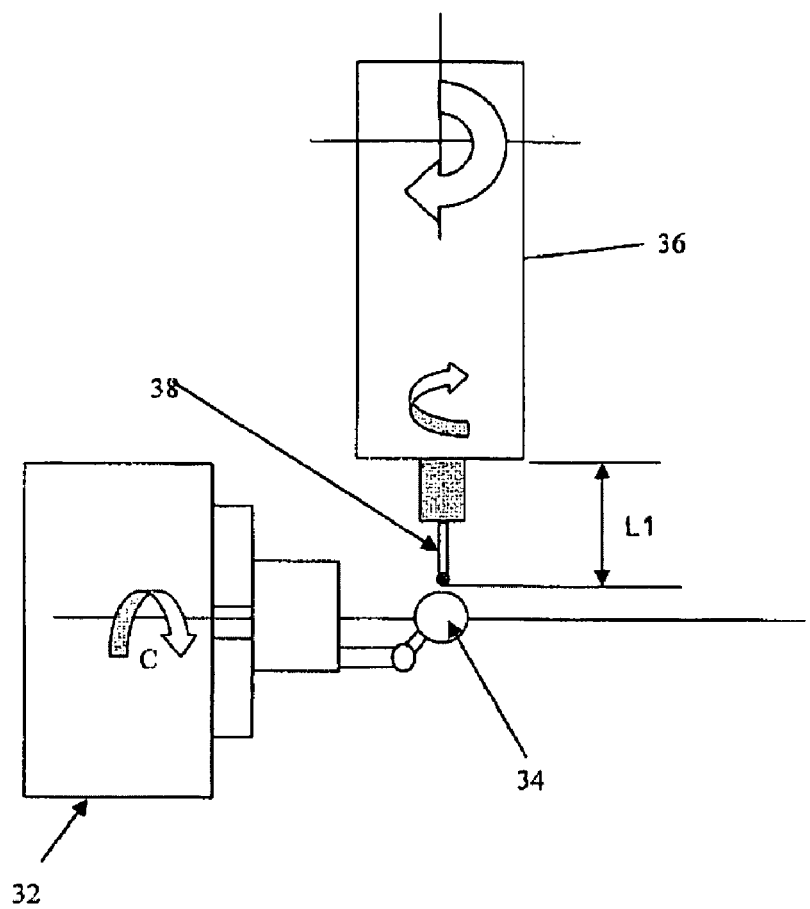

Referring now to FIG. 6, the swivel head mill-turn machine of FIG. 3 is shown with its mill head rotated through 90° (i.e. B=90°). As described above, swiveling the head away from the horizontal position in which the A and C axis alignment has been measured can introduce certain translational errors.

A method for calibrating the B-axis translation errors includes the steps of:

(A) Using a first probe of length L1 to determine the X, Y and Z position of the datum sphere with the B-axis at the orientation used to determine the relative alignment of the A and C axes (B=0° in the example described above). The first probe should be the same length as that used to determine the relative alignment of the A and C axes.

(B) Rotating the B-axis swivel head perpendicular to the chuck axis of rotation (i.e. to B=90° as shown in FIG. 6) and re-measuring the position of datum sphere in Y, Z then X, again using the first probe.

(C) Using a second probe of length L2 (L2 being different to L1) to determine the X, Y and Z position of the datum sphere with the B-axis at 0°.

(D) Rotating the B-axis swivel head perpendicular to B=90° and re-measuring the position of datum sphere in Y, Z then X, again using the second probe.

The difference, or error, in the x, y and Z datum sphere positions as measured in steps (A) and (B) using the tool of length L1 can then be calculated; this error may be denoted by $(X_{err1}, Y_{err1}, Z_{err1})$. The difference, or error, in the x, y and Z datum sphere positions measured in steps (C) and (D) using the tool of length L2 is $(X_{err2}, Y_{err2}, Z_{err2})$.

Taking the error measurements acquired using two tools of different length, the translation error over length is:

$$X_{err}(\text{per mm}) = \frac{X_{err2} - X_{err1}}{L_2 - L_1} \tag{3a}$$

$$Y_{err}(\text{per mm}) = \frac{Y_{err2} - Y_{err1}}{L_2 - L_1} \tag{3b}$$

$$Z_{err}(\text{per mm}) = \frac{Z_{err2} - Z_{err1}}{L_2 - L_1} \tag{3c}$$

Taking measurements using two probes of different length allows the translation error to be extrapolated back to a tool length of zero (gauge-line) enabling X Y and Z translation reference points $(X_{ref}, Y_{ref}, Z_{ref})$ to be determined. This enables the translation distance (X, Y and Z) to be determined for any tool of length $L_n$ via the expressions:

$$X = X_{ref} + (L_n \cdot X_{err}) \tag{4a}$$

$$Y = Y_{ref} + (L_n \cdot Y_{err}) \tag{4b}$$

$$Z = Z_{ref} + (L_n \cdot Z_{err}) \tag{4c}$$

Assuming the translation error varies sinusoidally with B-axis rotation, the translation distances can be applied for any intermediate B-axis position using the sine of the angle where 90° equals 1.0. Although a sinusoidal variation can be assumed, additional measurements could be made at intermediate B-axis rotation angles for increased accuracy.

It should be noted that although the above method is described for a swivel head machine, it is equally applicable to machines in which the milling head has a fixed position and the chuck can be tilted. For example, the turning machine may comprise a cradle holding the chuck.

Figure 7:
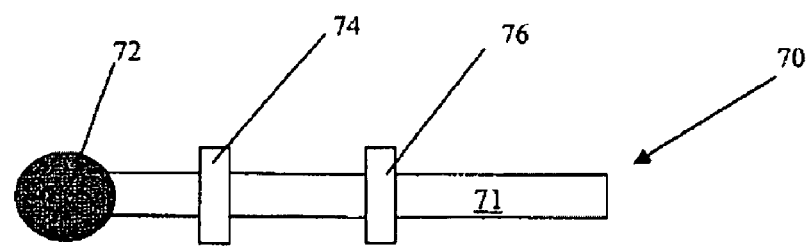

Although the above method may be implemented using two probes of different length, the technique could also employ a probe having a stylus with two (or more) tips of the type shown in FIG. 7 or by utilising two (or more) points on the stylus shank.

FIG. 7 illustrates a multi-tip stylus 70 having a shaft 71 that carries a first stylus tip 72 at its distal end and second 74 and third 76 stylus tips (or bands). The second and third tips are spaced apart from each other along the shaft 71.

Although such a stylus is particularly suited to implementing the above method, it may also be used in a number of alternative probing applications where measurements using two or more probes of different length is required.

Once a lathe or mill-turn machine has been calibrated using one or more of the methods outlined above, the position of a tool setting device may then be set. An example of such a tool setting procedure will now be described with reference to FIGS. 8 to 10.

Figure 8:
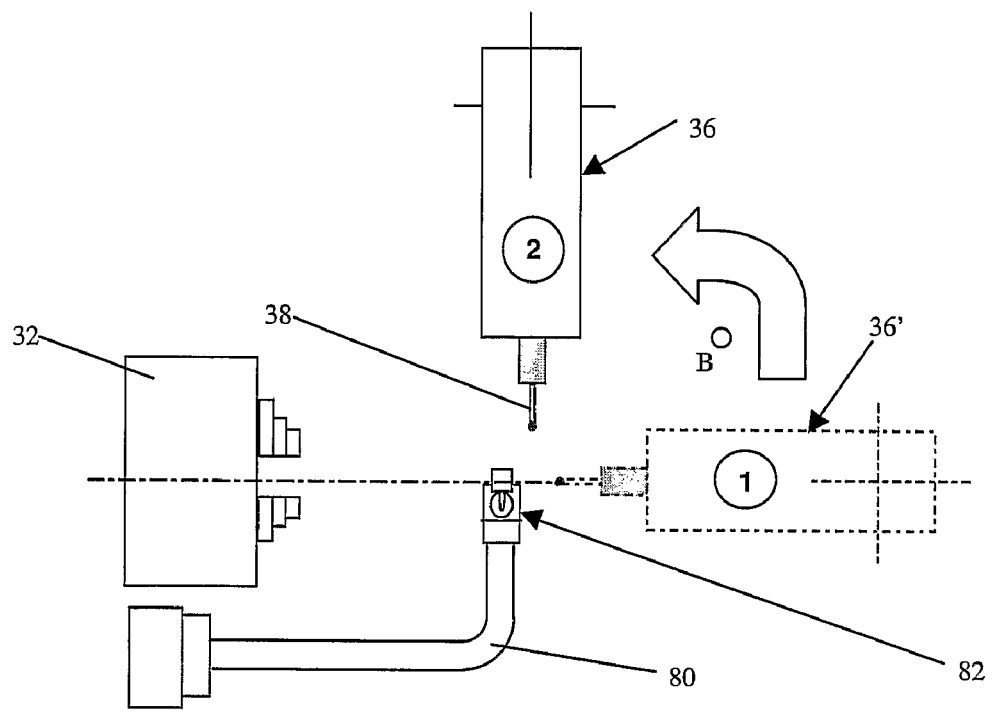

FIG. 8 shows a swivel head mill-turn machine of the type shown in FIG. 3. The mill turn machine comprises a mill head 36 that can be rotated about the B-axis, a rotatable chuck 32 and a tool setting arm 80. The tool setting arm 80 carries a tool setting cube 82 of known type.

The (x,y,z) position of the toolsetting device can be measured with the B-axis of the mill head 36 that carries the probe 38 being set at 90° and then with the B-axis of the mill head 36 set at 0°; these two mill head configurations are shown as 36 and 36' respectively in FIG. 8. The two sets of position measurements provide a calibrated link between the (known) machine spindle (C-axis) centreline and the toolsetting device.

Figure 9:
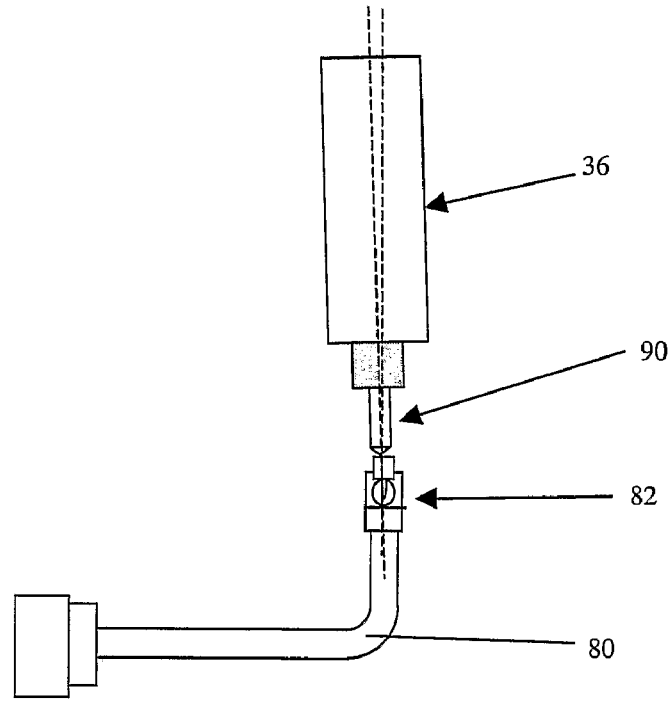

FIG. 9 shows the mill head 36 carrying a cutting tool 90 that is measured against the tool setting cube 82 of the tool setting arm 80. As there is a calibrated link between the machine spindle (C-axis) centre line and the toolsetting cube 92, a 3 axis (X,Y,Z) tool offset can be determined for the tool 90. This 3 axis offset will incorporate any inherent errors due to machine geometry issues at the cutting point of the tool.

In this manner, a calibrated link between the tool cutting edge(s) and the C-axis centre line is established. This ensures that any features that are subsequently machined with the 3 axis offset applied will be machined at the correct position.

Providing a calibrated measurement of tool edge position using a tool setting cube in this manner overcomes any squareness errors that are associated with the machine tool. For example, it is not uncommon to see 0.1 mm positional errors between short tools 100 mm long and a spindle probe 230 mm long due to so-called "Squareness errors".

Referring to FIG. 10(a), a "hybrid" toolsetting disc 100 is shown that incorporates flats 102 for measuring the edges of turning inserts. The disc may also be used for measuring tools at intermediate B-axis positions as shown in FIG. 10(b); these angled tools can be mills, drills etc.

Once a mill-turn machine has been calibrated using the above method, a periodic check may be performed to ensure that alignment is still maintained and to establish a tool offset error.

Referring to FIG. 11, a chuck 32 is shown to which a datum sphere 34 is attached. The associated milling head 36 holding a measurement probe 38 is also shown. The milling head 36 may be located at B=90° (illustrated by milling head 36) at B=45° (illustrated by milling head 36") or at B=0° (illustrated by milling head 36').

The alignment checking method comprises a first (vertical) probing routine that includes the steps of:
(a) Measuring the YZ centre ($Y_1, Z_1$) of the datum sphere at C=0°, A=0° and B=90°.
(b) Measuring the YZ centre ($Y_2, Z_2$) of the datum sphere at C=0°, A=180° and B=90°.
(c) Measuring the X position of the datum sphere with C=0°, A=180° and B=90° using the previously determined value for the YZ centre. The previously determined value for the YZ centre may be that measured during a previous alignment check or during the initial calibration process.
(d) Measuring the YZ centre ($Y_3, Z_3$) of the datum sphere at C=180°, A=180° and B=90°.
(e) Measuring the YZ centre ($Y_4, Z_4$) of the datum sphere at C=180°, A=0° and B=90°.
(f) Measuring the X position of the datum sphere with C=180°, A=0° and B=90° using the previously determined value for the YZ centre.

The exact YZ centre may then be found from the measurements taken at steps (a), (b), (c) and (d) using the expressions:

$$Y_{cen} = (((Y_1+Y_2)/2)+((Y_3+Y_4)/2))/2 \tag{5a}$$

$$Z_{cen} = (((Z_1+Z_2)/2)+((Z_3+Z_4)/2))/2 \tag{5b}$$

The exact YZ centre may be used to update the position of the sphere centre to the centre line (for use in the horizontal probing routine described below) and can also be used in any subsequent alignment checking process. The X-axis tool offset error can also be determined by taking the average value of the x positions measured in steps (c) and (f) and subtracting therefrom the (known) sphere diameter.

The alignment checking method may also comprise a second (horizontal) probing routine that includes the steps of:
(a) Measuring the XY centre ($X_1, Y_1$) of the datum sphere 34 with C=0°, A=0° and B=0°.
(b) Measuring the XY centre ($X_2, Y_2$) of the datum sphere 34 with C=0°, A=180° and B=0°.
(c) Measuring the XY centre ($X_3, Y_3$) of the datum sphere 34 with C=180°, A=180° and B=0°.
(d) Measuring the XY centre ($X_4, Y_4$) of the datum sphere 34 with C=180°, A=0° and B=0°.
(e) Measuring the Z position of the datum sphere with C=180°, A=0° and B=0° using the previously determined value for the YZ centre.

Taking the XY values measured in steps (a) to (d) allows the exact centre of the datum sphere 34 in X and Y to be calculated using the expressions:

$$X_{cen} = (((X_1+X_2)/2)+((X_3+X_4)/2))/2 \tag{6a}$$

$$Y_{cen} = (((Y_1+Y_2)/2)+((Y_3+Y_4)/2))/2 \tag{6b}$$

The Z-axis tool offset error can also be determined by subtracting half the (known) sphere diameter from the z-position measured in step (e) above.

In addition to the vertical and horizontal measurements described above, it is also possible to take measurements with the B-axis at 45° to check the exact centre in Y. Such a process may comprise the steps of
(a) Measuring the Y centre ($Y_1$) at C=0°, A=0° and B=45°.
(b) Measuring the Y centre ($Y_2$) at C=0°, A=180° and B=45°.
(c) Measuring the Y centre ($Y_3$) at C=180°, A=180° and B=45°.
(d) Measuring the Y centre ($Y_4$) at C=180°, A=0° and B=45°.

The above measurements of step (a) to (d) yield the exact centre in Y from equation (6b) above.

Figure 12:
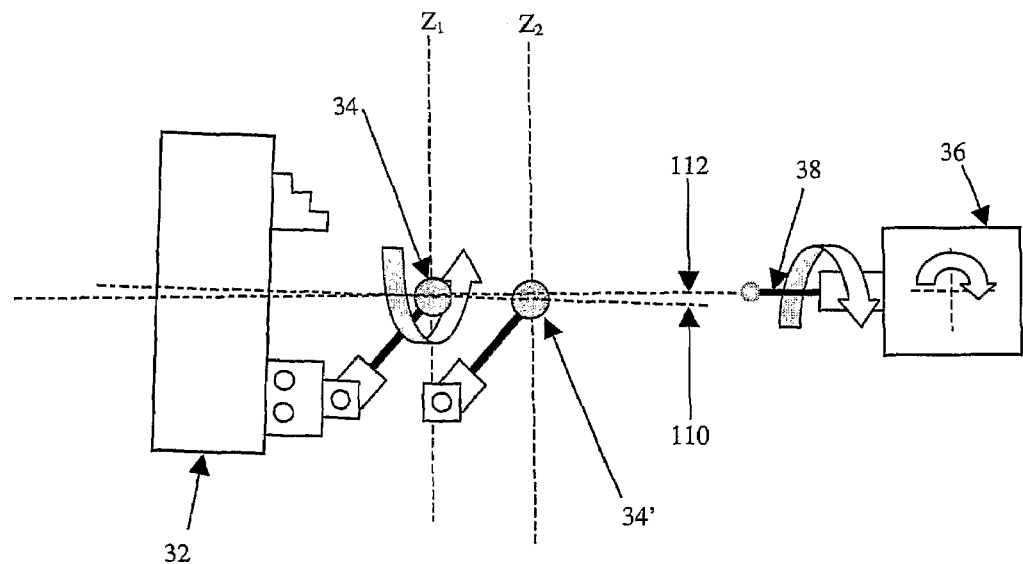

Referring to FIG. 12, a method for checking the axial alignment of the main spindle (i.e. the C-axis) relative to the z-axis of the machine will be described. In particular, FIG. 12 shows a chuck 32 to which a datum sphere 34 is attached. The associated milling head 36 holding a measurement probe 38 is also shown.

The process is based on measuring the position in X and Y of the datum sphere 34 at two positions along the Z-axis. In FIG. 11, the second z-axis position is shown by the datum sphere 34'. These two measurements allow any misalignment of the C-axis 110 relative to the z-axis 112 to be established. Misalignment of this type would cause a taper to be cut when a plain diameter is required and can thus be seen to have a detrimental effect on the quality of articles produced by a lathe or mill-turn machine.

The first stage of the alignment process comprises measuring the position of the datum sphere when it is located at position $Z_1$ along the z-axis. The following measurement steps are then performed:
(1) The XY centre ($X_1, Y_1$) of the datum sphere 34 is measured with C=0°, A=0° and B=0°.
(2) The XY centre ($X_2, Y_2$) of the datum sphere 34 is measured with C=0°, A=180° and B=0°.
(3) The XY centre ($X_3, Y_3$) of the datum sphere 34 is measured with C=180°, A=180° and B=0°.
(4) The XY centre ($X_4, Y_4$) of the datum sphere 34 is measured with C=180°, A=0° and B=0°.

The exact centre in X and Y can then be calculated using equation 6 above.

The second stage of the method comprises moving the datum sphere along the z-axis to the position $Z_2$ illustrated in FIG. 12. Steps (1) to (4) above are repeated for the second datum sphere position 34' from which the exact centre of the datum sphere 34' can be calculated using equation 6.

Any difference in the exact centre positions determined for datum sphere positions 34 and 34' (i.e. $Z_1$ and $Z_2$) indicates misalignment between the C and z axes. The amount of misalignment in the X and Y directions can be calculated, if required, using trigonometry.

Figure 13:
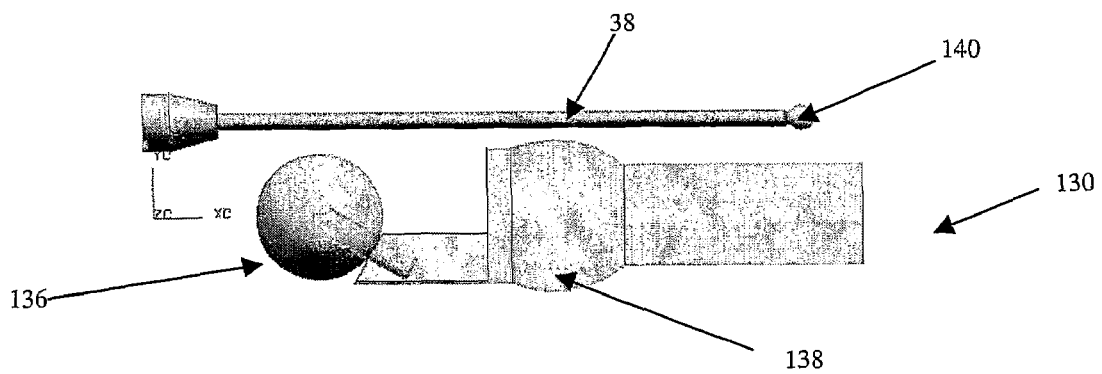

Instead of translating a datum sphere along the z axis, it is possible to provide a datum device having two spaced apart datum spheres. Referring now to FIG. 13, such a datum device 130 is shown. The datum device 130 comprises a first datum sphere 136 and a second datum sphere 138. An associated measurement probe 38 having a tip 140 is also shown. It should be noted that the second datum sphere 138 is, strictly, a partially truncated sphere but will be termed a datum sphere herein for convenience. Furthermore, additional datum spheres may be provided along the length of the datum device if required; i.e. the datum device may comprise two or more datum spheres spaced apart along a longitudinal axis.

The datum device 130 may be used in place of the single datum sphere 34 shown in FIG. 12. In other words, the datum device 130 may be held in the chuck 32 of a mill-turn machine. The provision of the datum device 130 allows alignment of the c and z axes to be measured in the manner described above with reference to FIG. 12, without requiring any lateral (z-axis) movement of the chuck. In other words, the x-y positions of the two datum spheres of the datum device 130 may be measured using the measurement probe 38 rather than determining the x-y centre of a single datum sphere in two different positions (e.g. $Z_1$ and $Z_2$).

Figure 14:
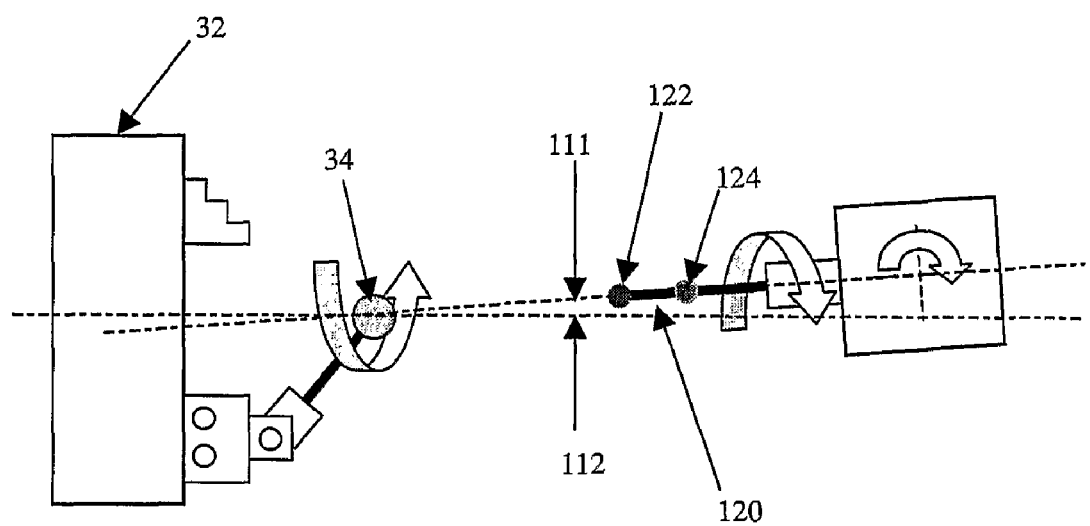

Referring to FIG. 14, a method for checking the alignment of the mill spindle (i.e. the A-axis 111) of a mill-turn machine relative to the z-axis of the machine will be described. The method is based on determining the position in X and Y of the datum sphere 34 held by a chuck 32 using a first tip 122 and a second tip 124 of a dual tip stylus 120 of the type described with reference to FIG. 7. These two measurements allow any misalignment of the A-axis 111 relative to the z-axis 112 to be established.

The method involves performing the measurement steps (1) to (4) described above with reference to FIG. 12 using the first tip 122. This allows the exact centre of the datum sphere 34 to be determined with the mill head 36 located in a first position along the z-axis. Measurement steps (1) to (4) are then repeated but the second tip 124 of the stylus is used in the measurements. This allows the exact centre of the datum sphere 34 to be determined with the mill head 36 located in a second position along the z-axis. Any variation in the measured X and Y positions of the datum sphere with the mill head 36 in the first and second positions thus provides a measure of misalignment.

As an alternative to using a dual tip stylus 120, one or all of the measurements used to determine the (x,y) position of the datum sphere(s) may be made using the shaft (i.e. not the tip) of the stylus. Such a measurement would typically involve taking a first measurement using the shaft, rotating the stylus by 180° and taking a second measurement again using the stylus shaft. The midpoint of the two measurements then provides an (x,y) position measurement. In other words, the (x,y) position of a datum sphere may be determined using the shank of a standard stylus thereby avoiding the need to provide styli of different lengths or a multiple tip stylus.

Furthermore, a datum device 130 of the type shown in FIG. 13 may be employed when performing the method described with reference to FIG. 14. The method may then comprise taking measurements of the (x,y) position of the second datum sphere 138 using the shank of the associated measurement probe with the probe in different (z-axis) positions.

The above methods, especially the method of finding the centre line of a lathe that is described with reference to FIGS. 1 and 2, can be implemented for the majority of turning machines that are presently in use. However, certain turning machines (especially large lathes) include measurement probes with a limited reach; i.e. the measurement probe can only be moved over a certain region that is smaller than the area covered by the chuck. In such circumstances, measuring the position of a feature rotated to diametrically opposed positions relative to the centre line may not be possible. However, the centre line of the turning machine can still be established using the method described below with reference to FIG. 15.

Figure 15:
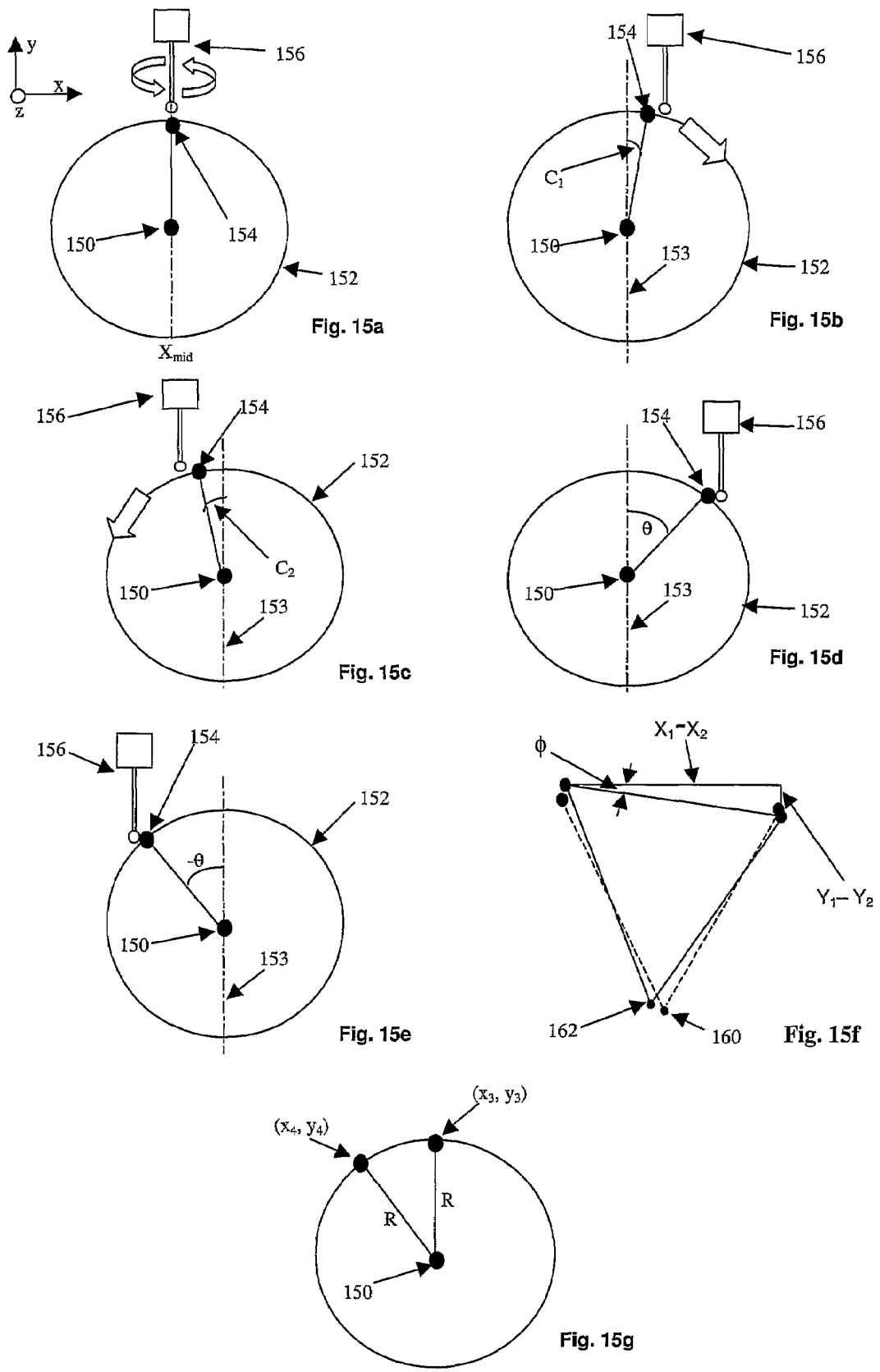

Referring to FIG. 15, a method for determining the centre line 150 of a large machine tool will be described. The machine tool comprises a rotatable spindle retaining a chuck 152 that has a datum sphere 154 attached to its outer edge. Also shown in FIG. 15 is a measurement probe 156 which is loaded into a tool holder of the mill spindle of the machine tool (not shown).

The method comprises the following steps:

Step 1: Referring to FIG. 15a, the probe stylus offset is determined. This is achieved by orientating the chuck 152 of the machine so that the datum sphere 154 is near the C=0° position. The measurement probe, which is held by a mill spindle that rotates about the A-axis, is rotated to A=0° and used to determine the position of the sphere in the x and z directions. The mill spindle is then rotated to A=180° where the position of the sphere in x and z is re-measured. The stylus offsets in x and z are half the difference in the sphere centre position of the two (i.e. A=0° and A=180°) measurements. The mill spindle is then rotated back to A=0°. The stylus offset determined in step 1 is used for all subsequent position measurements.

Step 2: Referring to FIGS. 15b and 15c, a method for centering the datum sphere 154 on the nominal X-axis centre line 153 is shown.

Firstly, the stylus of the measurement probe 156 is moved a small distance in the positive x-direction from the nominal X-axis centre line 153; see FIG. 15b. The C-axis is then rotated in a clockwise direction causing the datum sphere 154 to contact and hence trigger the measurement probe 156. The angle ($C_1$) through which the C-axis is rotated from the nominal X-axis centre line 153 to the probe trigger position is recorded.

Secondly, the stylus of the measurement probe is moved to a position on the other side of the nominal X-axis centre line 153 as shown in FIG. 15c. In this configuration, the stylus is the same distance from the nominal x-axis centre line and at the same y-position as it was in FIG. 15b. The C-axis is then rotated in an anticlockwise direction causing the datum sphere 154 to trigger the measurement probe 156. The angle ($C_2$) through which the C-axis is rotated from the nominal X-axis centre line 153 to the probe trigger position is recorded The C-axis zero rotation position (C=0°) is then adjusted to the angle $C_{shift}$, where:

$$C_{shift} = \frac{C_1 + C_2}{2} \qquad (7)$$

The c-axis is then rotated to the new C=0° position so that the datum sphere centre is aligned with the nominal X-axis centre line 153.

Step 3: Referring to FIGS. 15d and 15e, the datum sphere position is established either side of the nominal x-axis centre line 153.

As shown in FIG. 15d, the chuck is firstly rotated clockwise (from C=0°) through a known angle θ (where θ is typically between 30°-45°) so that the datum sphere 154 is in a first position (i.e. C=θ). The position of the datum sphere (x₁,y₁) is then measured using the measurement probe 156.

Referring to FIG. 15e, the chuck is then rotated anticlockwise so that the datum sphere is at an angle of −θ from the nominal x-axis centre line (i.e. C=−θ). The position of the datum sphere (x₂,y₂) is then measured using the measurement probe 156.

Step 4: The difference between the Y axes positions y₁ and y₂ that were measured in step 3 is determined.

If the difference between y₁ and Y₂ is minimal (e.g. if it is less than 10 μm) then the X-axis midpoint (X$_{mid}$) is given by:

$$X_{mid} = \frac{(x_1 + x_2)}{2} \quad (8)$$

In this case, step 6 below can be performed to determine the position of the centre line (Y$_{cen}$, X$_{cen}$).

If the difference in y₁ and y₂ is substantial (e.g. if it is greater than 10 μm) it indicates a substantial deviation between the nominal and actual centre line positions. In this case, step 5 is performed.

Step 5: As shown in FIG. 15f, a substantial difference in the measured values of y₁ and y₂ can arise if the nominal c-axis centre 160 is shifted in x and y by a substantial amount relative to the actual C-axis centre 162. This would lead to an error in the values of Y$_{cen}$ and X$_{cen}$ that are calculated in step 6 below.

To overcome such an error, it is possible to adjust the C-axis rotary alignment. In other words, the C=0° position can be adjusted by the angle (φ) where:

$$\phi = \arctan\left\{\frac{(y_1 - y_2)}{(x_1 - x_2)}\right\} \quad (9)$$

Following adjustment of the C=0° position, steps 3 and 4 can be repeated so that (x₁,y₁) and (x₂,y₂) can be re-measured thereby providing a new x-axis midpoint values (X$_{mid}$) via equation (8).

Step 6: Once values of (x₁,y₁), (x₂,y₂) and X$_{mid}$ have been established, the position of the C-axis centre of rotation (X$_{cen}$, Y$_{cen}$) can be determined.

As shown in FIG. 15g, this is achieved by firstly measuring the position (x₃,y₃) of the datum sphere on the X-axis centre line (i.e. at C=0°). The C-axis is then rotated so that the datum sphere is in a position away from the x-axis centre line and its new position (x₄,y₄) is measured.

Using the measurements (x₃,y₃) and (x₄,y₄), the radius of rotation (R) is given by:

$$R = \frac{((x_3 - x_4)^2 + (y_3 - y_4)^2)}{2(y_3 - y_4)} \quad (10)$$

Having determined the radius (R) using equation (10), the position of the centre of rotation, or C-axis, of the chuck (X$_{cen}$, Y$_{cen}$) is given by:

$$X_{cen} = X_{mid} \quad (11a)$$

$$Y_{cen} = y_3 - R \quad (11b)$$

As noted above, the advantage of this method is that it can be used in turning machines, such as very large lathes of the type used in the aviation industry, where measurement probe access to regions of the machine is limited. Furthermore, the method does not require a part to be loaded into the chuck of the lathe and attaching the datum sphere attached to periphery of the chuck will not interfere with machining operations.

Although the above method uses a datum sphere attached to the chuck, it should be noted that many alternative features could be used instead. In fact, any feature could be used in the method that has a position which is measurable in both the x and y axes; for example, the feature may comprise a hole, bore, boss, pad, pocket, or block. The reference feature may be a permanent part of the machine chuck or it may be formed in a part that is temporarily attachable to the chuck.

Furthermore, although FIG. 15 shows a probe that lies in the x-y plane, it should be noted the method could also be applied using a probe having a stylus that is orientated out of the x-y plane. For example, the probe may be orientated at 90° to the x-y plane in which case the reference feature (e.g. the datum sphere) could be arranged to project from the face of the chuck rather than projecting from the periphery.

It should also be noted that the method described with reference to FIG. 15 may be applied to find the centre line of any rotatable portion. For example, it may be applied to not only finding the centre line of turning machines, but also to finding the centre of rotation of tables etc that are used to hold workpieces in large milling machines.

Figure 16:
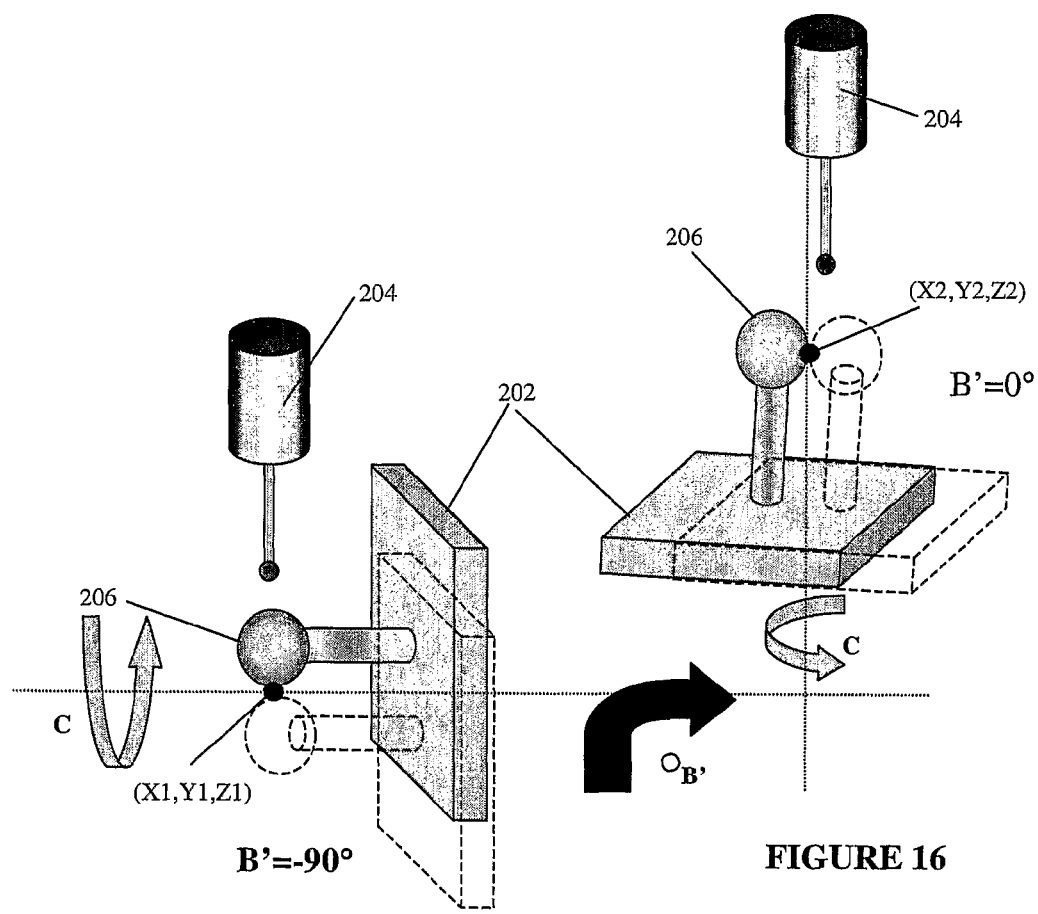
FIG. 16 shows a mill-turn machine having a tiltable table.

Referring to FIG. 16, a further mill-turn machine is illustrated. The machine 200 comprises a workpiece carrying table portion 202 to which a calibration sphere 206 is attached. A measurement probe 204 is carried by a tool arm (not shown) and the apparatus allows the measurement probe to be translated along x, y and z axes relative to the table portion 202. Although not shown, the tool arm could comprise a rotatable portion (e.g. a milling spindle) that allows the probe to be rotated about its longitudinal axis.

The table portion 202 is rotatable about the C-axis. In addition, the table portion 202 is carried by a cradle allowing it to be tilted in the yz plane about a pivot point; i.e. the table portion can be tilted about what is herein termed the B'-axis.

FIG. 16 shows the table portion 202 tilted into two different positions; these are the B'=−90° and B'=0° positions. To establish the position of the B'-axis (i.e. the pivot point) in the yz plane, the following measurements can be made:

(i) The position of the sphere 206 is measured with B'=−90° and C=0°
(ii) The C-axis is rotated through 180° (as shown by the dashed lines) and the position of the sphere is re-measured (i.e. with B'=−90° and C=180°).
(iii) The B-axis is then tilted to B'=0° and a measurement of sphere position is taken with C=180°.
(iv) The C-axis is rotated through 180° (as shown by the dashed lines) and the position of the sphere is re-measured (i.e. with B'=0° and C=0°).

Figure 17:
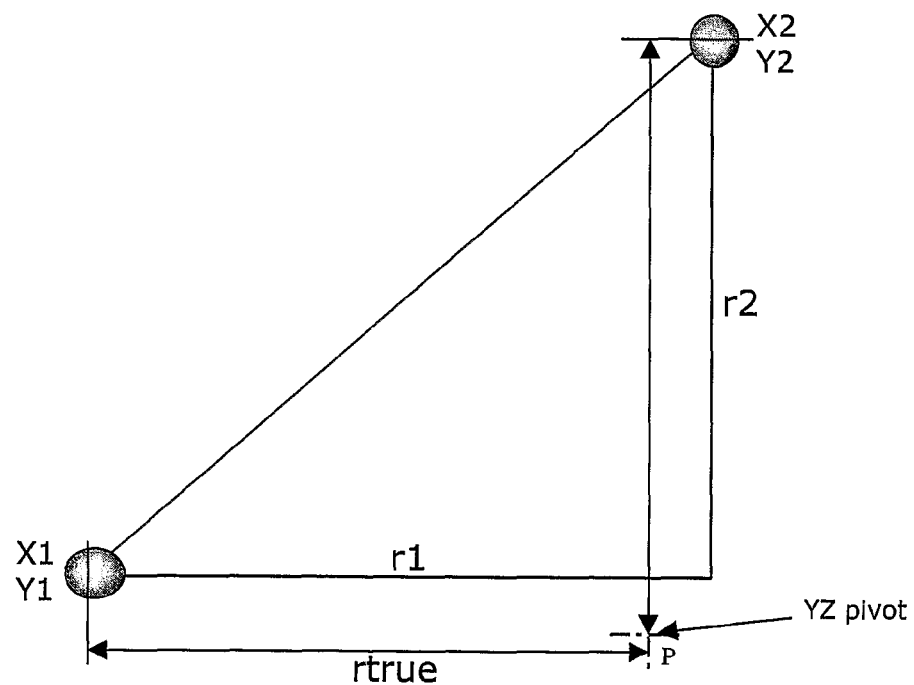
FIG. 17 shows the geometry of the apparatus of FIG. 16.

Referring additionally to the geometric illustration of the machine shown in FIG. 17, the mean measurements of steps (i) and (ii) provide a first sphere point measurement (X1, Y1, Z1) that lies on the C-axis when B'=−90°. The mean measurements of steps (iii) and (iv) provide a second sphere point measurement (X2, Y2, Z2) that lies on the C-axis when B'=0°.

The difference between the values of Y1 and Y2 provides a first radius value r1. The difference between the values of Z1 and Z2 provides a second radius value r2.

The average radius value r$_{true}$ is:

$$r_{true} = \frac{r1 + r2}{2} \quad (12)$$

The position of the B' axis in Y and Z is thus:

$$Y_{pivot} = Y1 - r_{true} \quad (13a)$$

$$Z_{pivot} = Z1 - r_{true} \quad (13b)$$

In this manner, it is possible to establish the B'-axis location P in the YZ plane. In other words, the YZ pivot point of the table portion 202 can be found. Knowing the position of the pivot point of the B'-axis allows the position of the table portion 202 relative to the measurement probe 204 to be accurately determined for any B'-axis orientation. Appropriate translation error corrections can thus be applied to the tool arm position for different tilts of the table portion 202.

The procedure described with reference to FIGS. 16 and 17 can be used instead of (or in addition to) taking measurements using two probes of different length as described above with reference to FIGS. 6 and 7. It should also be noted that such a technique can be used with milling, and not just mill-turn, machines. For example, the technique could be applied to milling machines in which the workpiece is mounted on a tiltable table. The technique described with reference to FIGS. 16 and 17 comprises a machine having a chuck mounted on a tiltable table. However, it should be noted that an analogous technique can be applied to swivel head mill-turn machine as described below.

Figure 18:
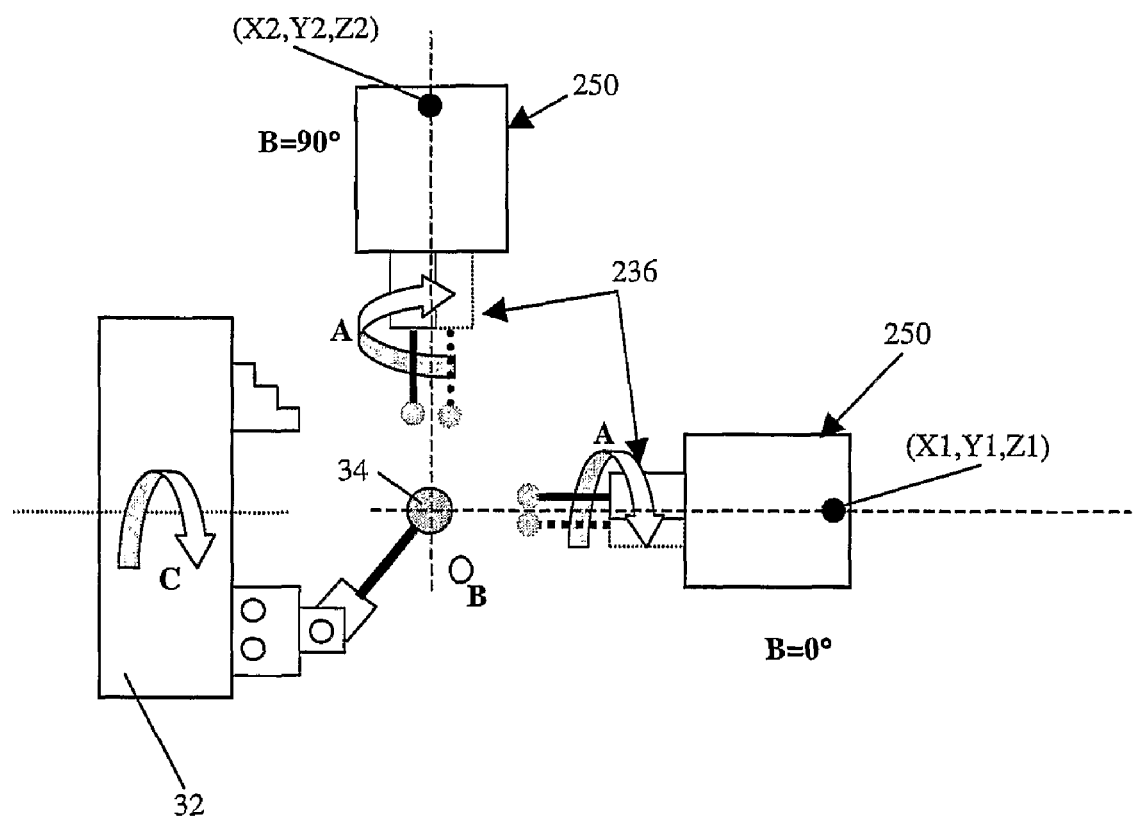
FIG. 18 show the swivel head equivalent to FIG. 16.

Referring to FIG. 18, a machine is shown having a chuck 232 that can be rotated about the C-axis. A calibration sphere 234 is carried by the chuck and a measurement probe 236 is carried by a swivel head 238. In this example, the C-axis of the chuck is fixed relative to the machine and the swivel head 238 is a milling head that can rotate the probe 236 (or a tool etc) about the A-axis. The swivel head 238 can also be swiveled about the B-axis. In FIG. 18, the swivel head is shown in the B=0° and B=90° orientations.

By analogy with the above described method, the centre of the calibration sphere 234 may be found with the measurement probe 236 rotated at A=0° and A=180° for both the B=0° and the B=90° orientations. This provides the position of points (X1,Y1,Z1) and (X2,Y2,Z2) on the measurement head relative to the (fixed) centre of the calibration sphere 234. The geometric relationship shown in FIG. 17 thus also provides the pivot point of the swivel head 238; i.e. the position of the B-axis. Again, knowing the position of the B-axis allows any translation errors to be removed for intermediate B-axis orientations.

The skilled person would appreciate that the above examples are representative of the general calibration process of the present invention. Numerous variations to the specific methods described herein would be apparent to the skilled person on reading the present specification and appended claims.

The invention claimed is:

1. A method of calibrating a turning machine having a first rotatable portion for holding a workpiece and a second rotatable portion for holding a measurement probe, the first rotatable portion having a first feature associated therewith, the method comprising the steps of;
   (i) using the measurement probe to determine a position of the first feature,
   (ii) rotating the first rotatable portion through an angle to a new position,
   (iii) using said measurement probe to determine the new position of the first feature, and
   (iv) rotating the second rotatable portion through an angle.

2. A method according to claim 1 and further comprising the step of (v) calculating the position of the axis of rotation of the first rotatable portion using the position measurements determined in steps (i) and (iii).

3. A method according to claim 1 wherein step (ii) comprises rotating the first rotatable portion through an angle of 180°.

4. A method according to claim 1 wherein step (ii) comprises rotating the first rotatable portion through an angle of less than 180°.

5. A method according to claim 4 wherein step (ii) comprises rotating the first rotatable portion through an angle of no more than 90°.

6. A method according to claim 4 comprising an initial step of determining the position of the axis of rotation of the first rotatable portion in a first machine axis.

7. A method according to claim 6 wherein step (i) comprises orientating the first rotatable portion so that the first feature is located substantially on said first machine axis.

8. A method according to claim 1 wherein steps (ii) and (iii) are repeated one or more times.

9. A method according to claim 1 wherein step (ii) comprises rotating the first and second rotatable portions through 90°, and steps (ii) and (iii) are performed four times.

10. A method of calibrating a turning machine having a first rotatable portion for holding a workpiece and a second rotatable portion for holding a measurement probe, the first rotatable portion having a first feature associated therewith, the method comprising the steps of;
   (i) using the measurement probe to determine a position of the first feature,
   (ii) rotating the first rotatable portion through an angle to a new position, and
   (iii) using said measurement probe to determine the new position of the first feature,
   wherein the second rotatable portion is carried by a swivel head, the swivel head being rotatable about an axis.

11. A method of calibrating a turning machine having a first rotatable portion for holding a workpiece and a second rotatable portion for holding a measurement probe, the first rotatable portion having a first feature associated therewith, the method comprising the steps of;
   (i) using the measurement probe to determine a position of the first feature,
   (ii) rotating the first rotatable portion through an angle to a new position,
   (iii) using said measurement probe to determine the new position of the first feature, and
   (iv) determining the relative displacement of the axes of rotation of the first rotatable portion and the second rotatable portion.

12. A method of determining a position of an axis of rotation of a first rotatable portion as a function of displacement along a translational axis of a turning machine, the turning machine having a first rotatable portion for holding a workpiece, the first rotatable portion having a first feature associated therewith, the method comprising the steps of:
   (A) determining the position of the axis of rotation of the first rotatable portion, the determining comprising the sub-steps of:
      (i) using a measurement probe to determine a position of the first feature,
      (ii) rotating the first rotatable portion through an angle to a new position, and (iii) using said measurement probe to determine the new position of the first feature, (B) translating at least one of the measurement probe and the first rotatable portion along said translational axis, and (C) repeating step (A).

13. A method according claim 12 and further comprising the step of (D) determining the angular alignment of the axis of rotation of the first rotatable portion relative to an axis of the turning machine.

14. A method of aligning a swivel axis turning machine having a first rotatable portion for holding a workpiece and a second rotatable portion for holding a tool or tool accessory, wherein the axis of rotation of the first rotatable portion can be tilted relative to the axis of rotation of the second rotatable portion and the first rotatable portion has a second feature associated therewith, the method comprising the steps of:

(a) taking a swivel axis turning machine in which the relative displacement of the axes of rotation of the first rotatable portion and the second rotatable portion have been determined using the method according to claim 11, (b) using a measurement probe held by the second rotatable portion to determine the position of the second feature, and (c) altering the tilt between the axis of rotation of the first rotatable portion and the axis of rotation of the second rotatable portion and repeating step (b).

15. A method according to claim 14 in which the swivel axis turning machine comprises a swivel head turning machine and the second rotatable portion is carried by the swivel head, wherein step (c) comprises rotating the swivel head to a different orientation and repeating step (b).

16. A method according to claim 14 comprising the step of determining the position of the pivot point between the axis of rotation of the first rotatable portion and the axis of rotation of the second rotatable portion.

17. A method according to claim 14 comprising the step of determining tool offset error as a function of the relative tilt between the axes of rotation of the first rotatable portion and the second rotatable portion.

18. A method according to claim 14 wherein step (b) is repeated with a different displacement between the second feature and the second rotatable portion.

19. A method according to claim 18 wherein step (b) is repeated using two or more stylus tips, each stylus tip having a different displacement from the second rotatable portion.

20. A method according to claim 19 wherein step (b) is performed using a multi-tip stylus.

21. A method according to claim 19 wherein step (b) is performed using two different length styli.

22. A method according to claim 18 wherein step (b) is performed at least once using the shank of the stylus of the measurement probe to determine the position of the second feature.

23. A method according to claim 18 comprising the step of determining tool offset error as a function of tool length and the relative tilt between the axes of rotation of the first rotatable portion and the second rotatable portion.

24. A method according to claim 14 wherein a common feature provides both the first feature and the second feature.

25. A method according to claim 14 wherein the second feature comprises a datum sphere.

26. A method according to claim 14 wherein the second feature comprises a shaft comprising two or more datum spheres.

27. A method according to claim 1 wherein the first rotatable portion of the turning machine comprises said first feature.

28. A method according to claim 1 wherein the first rotatable portion holds a part comprising said first feature.

29. A method according to claim 28 wherein the part comprises a protrusion forming said first feature.

30. A method according to claim 1 comprising the step of using the measurement probe to determine the position of a tool setting device relative to the position of the axis of rotation of the first rotatable portion.

31. Automated turning machine apparatus suitably programmed to implement a method according to claim 1.

32. A non-transitory computer readable medium having a computer program for controlling a turning machine, the computer program being such that, when loaded into the computer controller of a suitable turning machine, the machine can implement the method according to claim 1.

33. Automated turning machine apparatus suitably programmed to implement a method according to claim 10.

34. A non-transitory computer readable medium having a computer program for controlling a turning machine, the computer program being such that, when loaded into the computer controller of a suitable turning machine, the machine can implement the method according to claim 10.

35. Automated turning machine apparatus suitably programmed to implement a method according to claim 11.

36. A non-transitory computer readable medium having a computer program for controlling a turning machine, the computer program being such that, when loaded into the computer controller of a suitable turning machine, the machine can implement the method according to claim 11.

37. Automated turning machine apparatus suitably programmed to implement a method according to claim 12.

38. A non-transitory computer readable medium having a computer program for controlling a turning machine, the computer program being such that, when loaded into the computer controller of a suitable turning machine, the machine can implement the method according to claim 12.

\* \* \* \* \*